July 15, 1924.

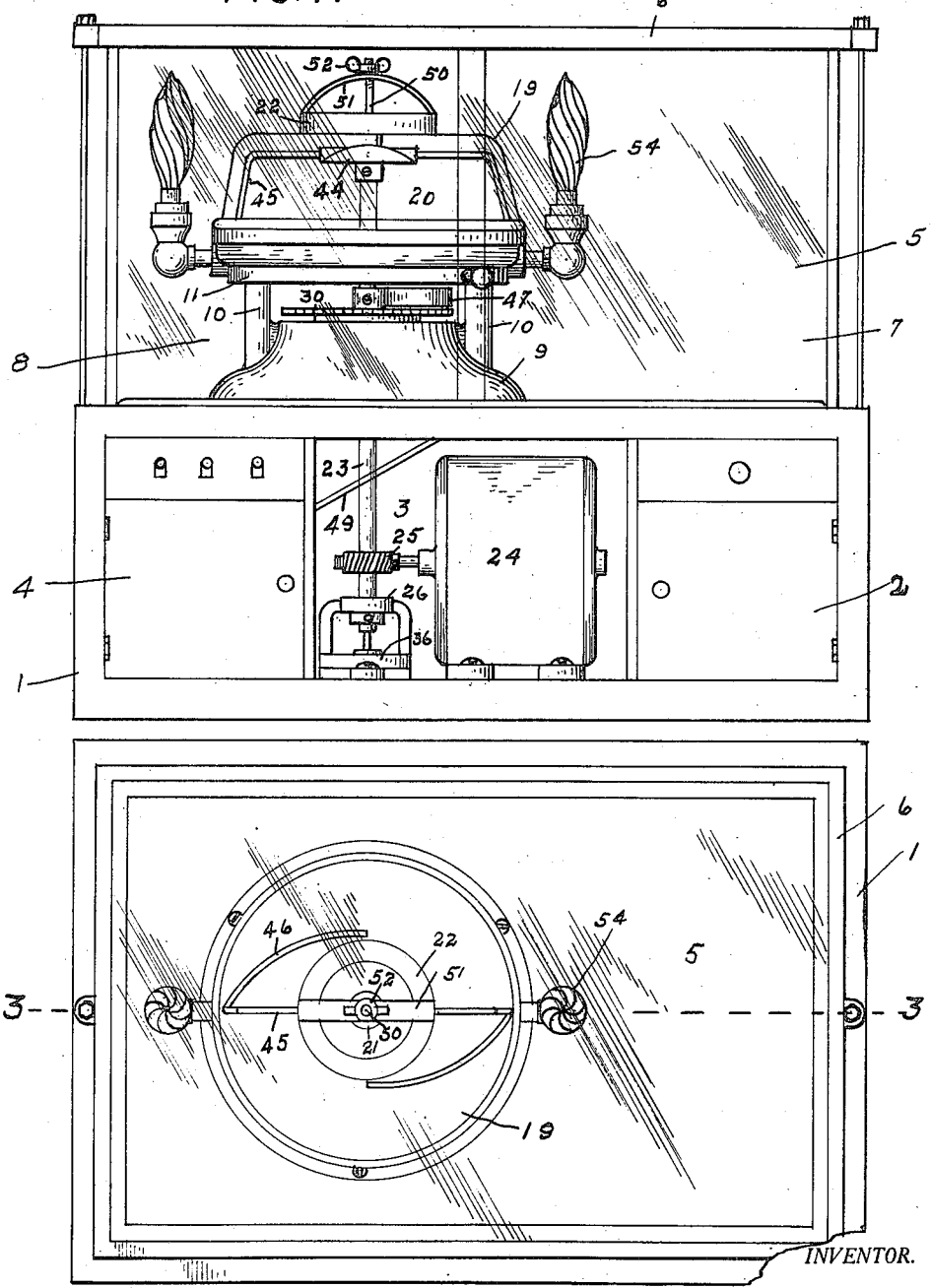

L. J. ISENHOUR

CORN POPPING MACHINE

Filed Aug. 27, 1923

INVENTOR.
LUTHER J. ISENHOUR

BY
Carey S. Frize
ATTORNEY.

Patented July 15, 1924.

1,501,168

UNITED STATES PATENT OFFICE.

LUTHER J. ISENHOUR, OF INDIANAPOLIS, INDIANA.

CORN-POPPING MACHINE.

Application filed August 27, 1923. Serial No. 659,646.

*To all whom it may concern:*

Be it known that I, LUTHER J. ISENHOUR, a citizen of the United States, residing at Indianapolis, in the county of Marion and State of Indiana, have invented new and useful Improvements in Corn-Popping Machines, of which the following is a specification.

This invention relates to corn-popping machines, preferably of the automatic type and one feature of the invention is the provision of a heating element having an axial opening for the discharge of the corn therefrom.

A further feature of the invention is the provision of means for automatically agitating the grains of corn while being popped and moving the popped grains gradually towards the axial discharge opening in the heating element.

A further feature of the invention is the provision of a retaining member for normally preventing the unpopped grains from entering the discharge opening through the heating element, means being provided for elevating the retaining member so that all the grains, popped or un-popped, will be discharged through the axial opening of the heating element.

A further feature of the invention is the provision of a substantially enclosed popping chamber whereby an intense heat will be obtained with the expenditure of a minimum amount of heat producing medium.

A further feature of the invention is in so confining the heating element that the heated air will be conveyed directly in contact with the grains of corn while being popped.

A further feature of the invention is the provision of means for separating the popped from the un-popped or partially popped grains as they discharge through the opening in the heating element, means being provided for depositing the popped grains at one point and the un-popped grains at another point.

A further feature of the invention is the provision of means for locking the several elements of the machine together, and in such manner that the parts may be quickly assembled or separated.

Other objects and advantages will be hereinafter more fully set forth and pointed out in the accompanying specification.

In the accompanying drawings which are made a part of this application,

Figure 1 is a front elevation of the popping machine;

Figure 2 is a top plan view thereof.

Figure 3:
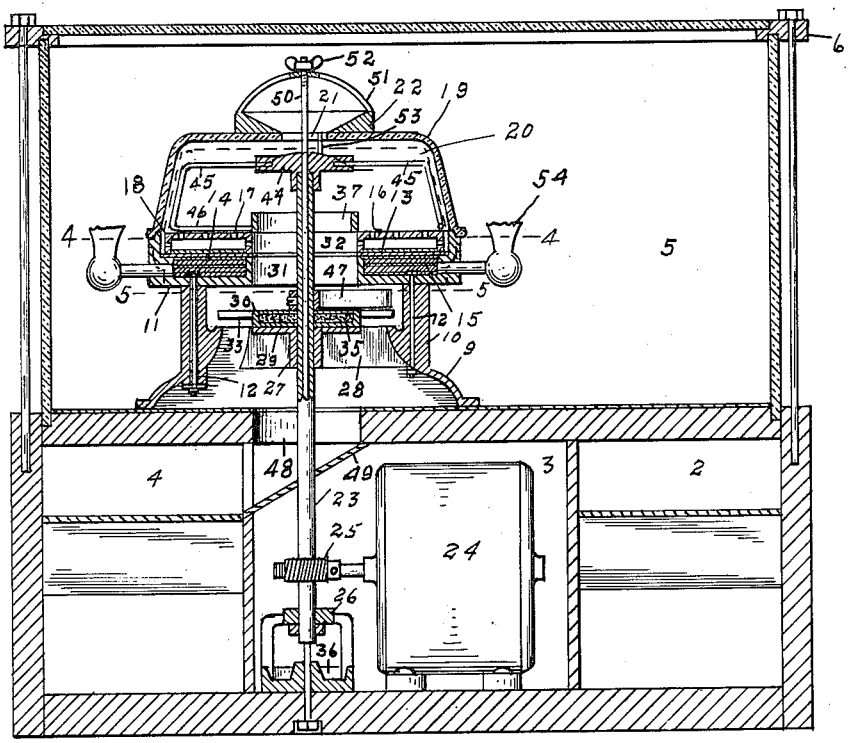
Figure 3 is a sectional view as seen on line 3—3, Fig. 2.
Figure 4:
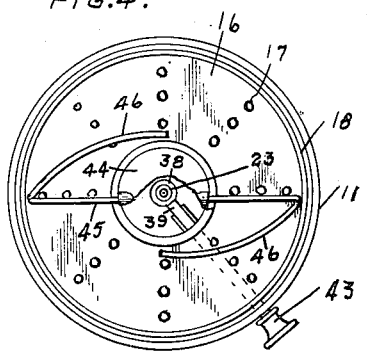
Figure 4 is a sectional view as seen on line 4—4, Fig. 3.
Figure 5:
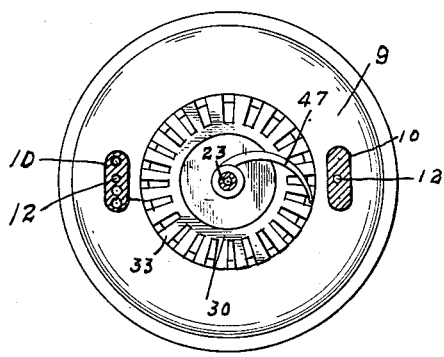
Figure 5 is a sectional view as seen on line 5—5, Fig. 3.

Referring to the drawings in which similar reference numerals designate corresponding parts throughout the several views, 1 indicates a supporting cabinet, which is preferably divided into compartments 2, 3 and 4 for purposes to be hereinafter set forth.

Mounted above the cabinet is a housing 5, the walls of which are preferably constructed of sections of glass or other transparent material, a frame 6 being provided for holding the sections of glass in assembled position. The front panel of glass is preferably formed in two sections 7 and 8, so that they may be slid in opposite directions for gaining access to the interior of the housing.

Mounted upon the top portion of the cabinet 1 and within the housing 5 is the base portion 9 of the popper proper, said base being hollow and having posts 10 projecting upwardly therefrom for supporting a chamber 11, bolts 12 or other suitable means being provided for securing the chamber to the posts. Located within the chamber 11 is a heating element 13, which in this instance, is heated by electricity, although it will be understood other suitable means may be provided for heating the element.

The heating element is mounted upon a heat resisting and insulating disc 14, while a plurality of heat resisting and insulating sections 15 are positioned below the disc 14, thereby preventing the electrically energized parts from coming in contact with the metal parts of the popper.

A hood 16, also of heat resisting and insulating material is positioned over and around the heating element so as to confine as much of the heat as possible below the upper face of the hood, a plurality of openings 17 being formed through the face and side walls of the hood for the passage of a limited amount of the heat generated by the heating element. The peripheral or side walls of the hood 16 are spaced from the side walls of the chamber 11 to provide a passage 18 for the heat escaping through the openings in the side walls of the hood.

Fitting over the upper edge of the chamber 11 is an inverted bowl 19 which forms a popping chamber 20, the meeting edges of the bowl and chamber 11 being so constructed that they will form a very close union and prevent the escape of heat at their point of union, the bowl being entirely enclosed except a small aperture 21 at its apex through which the grains of corn descend into the popping chamber 20 from a hopper 22. This aperture, however, is of such small diameter that but a very minor portion of the heat will escape therethrough, thereby retaining the entire heating quality of the heating element for popping the corn and in effect, using the heat over and over for popping purposes and reducing the amount of electricity or other heating medium to a minimum while attaining a maximum heat.

Extending vertically through the central portion of the popping element proper and into the compartment 3 of the cabinet 1 is a driving shaft 23 which is driven from any suitable source, in this instance, a motor 24, a worm gear 25 connecting the motor to the shaft.

The lower end of the shaft 23 is mounted in a bearing 26, secured to the floor of the compartment 3, while the upper portion of the shaft extends through a sleeve 27 carried by the base 9, arms 28 connecting the sleeve 27 to the walls of the base. The upper end of the sleeve 27 is provided with a disc 29 upon which rests a separating plate 30, the peripheral edge of the disc 29 being of less diameter than the diameter of the upper end of the base 9 so as to provide a passage for unpopped or partially popped grains.

The chamber 11 and hood 16 are provided with central openings 31 and 32, respectively, through which the popped grains escape from the popping chamber 20 and in the event partially popped grains should descend with the properly popped grains, the separating disc is provided around its periphery with spaced fingers 33 which will permit the unpopped or partially popped grains to descend through the space between the upper edge of the base 9 and the peripheral edge of the disc 29. The disc 29 is preferably provided with a depression 34 in which is to be placed a section 35 of felt or other absorbent material for holding a lubricant so that the lubricant will be gradually fed onto the bearing points of the shaft 23. In the event of a surplus flow of lubricant down the shaft 23, a pan 36 is formed on the base of the bearing 26 for catching such excess flow, any suitable form of drain for the pan being provided (not shown).

Resting upon the upper face of the hood 16 and in registration with the openings 31 and 32 is a collar 37 which is of sufficient height to normally prevent the unpopped grains from leaving the surface of the hood 16, but in the event it is desired to release all the corn from the popping chamber, the collar 37 may be raised a distance above the surface of the hood so that all the grains, whether popped or unpopped, will descend through the openings 31 and 32. The collar is elevated vertically by placing a bearing 38 around the shaft 23 and connecting the bearing with the collar by means of a bar 39, the lower edge of which is provided with a tapered face 40 with which engages the tapered end 41 of an arm 42 on the inner end of a pull rod 43. With this construction, when an outward pull is made on the rod 43, the collar will be elevated and held in an elevated position until the rod is again pushed inwardly. It will be understood of course that various devices may be provided for elevating the collar, and I do not desire to be confined to the particular structure shown.

Mounted on the upper end of the shaft 23 is a head 44, radiating from which are one or more stirring arms 45, the free ends 46 of said arms being so arranged, that when the shaft 23 is rotated, they will move over the surface of the hood 16 and agitate all the grains of corn resting thereon. In addition to agitating the grains of corn, the ends 46 are so curved that they will gradually move the popped grains towards the axis of the popper, causing them to pass over the top of the collar 37 and descend through the openings 31 and 32 onto the separating plate 30, from whence they are discharged into the housing 5, the grains being forced from off the plate by means of a curved arm 47 carried by and rotatable with the shaft 23. Should any partially or unpopped grains descend with the popped grains, they will drop between the fingers 33 and pass through an opening 48 in the roof of the cabinet and onto an inclined floor 49 which carries them into the compartment 4 of the cabinet.

The bowl 16 and chamber 11 are held in assembled relation by extending a rod 50 centrally through the shaft 23, the head 44 and the opening 21 and through a clamp 51, the ends of which engage the edges of the hopper 22. A wing nut 52 is threaded onto the upper end of the rod 50 and as the head end of the rod engages the bottom wall of the cabinet 1 the chamber 11, bowl 16 and hopper 22 will be securely locked together. Extending upwardly from the head 44 and through the opening 21 is a pin 53 which rotates with the head and prevents the grains of corn clogging in the opening.

If preferred one or more incandescent lamps 54 may be mounted within the housing 5 for the purpose of illuminating the interior of the housing and for lending a pleasing effect to the popping device.

Figure 7:
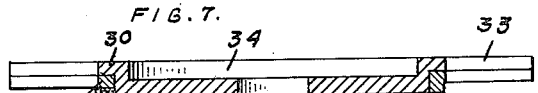
Figure 7 is an enlarged sectional view through the separating plate showing a slightly modified form.
Figure 6:
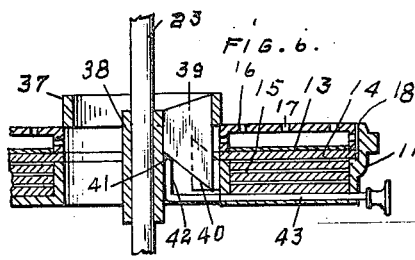
Figure 6 is an enlarged sectional view through the heating element and parts associated therewith.

As best shown in Fig. 7 of the drawings, a slightly different form of separating plate is shown, in that a secondary plate 55 is provided, which is adjustable with respect to the plate proper so that the space through which the unpopped grains discharged may be increased or decreased, any suitable means being provided for locking the secondary plate in its adjusted position.

What I claim is:

1. In a popping machine, a popping chamber, a horizontally disposed heating element in said popping chamber having an axial discharge opening, and means for moving the contents of the popping chamber towards the axial center of the popping chamber for discharging the same from the popping chamber.

2. In a popping machine, a substantially air tight popping chamber, a heating element in said popping chamber having an axial discharge opening therethrough, and means for agitating the grains on said heating element and moving the same towards the axis of said heating element for discharging the same through said opening.

3. In a corn popping machine, a popping chamber, a heating element, means for conveying grains of corn onto said heating element, means for causing said grains to move toward the axis of the heating element for discharging therefrom, and means for separating the popped from the un-popped grains.

4. In a corn popping machine, a popping chamber, a heating element in said popping chamber having an axial discharge opening, means for entering grains of corn onto said heating element, means for agitating said grains of corn and gradually moving the same to the discharge opening in said heating element, means for normally retaining the un-popped grains on said heating element, and means for elevating said retaining member whereby all the grains may leave the heating element.

5. In a corn popping machine, an inverted bowl like popping chamber, a hopper on said popping chamber, a supporting chamber for said popping chamber, and means for detachably connecting said chambers together comprising a rod having one end anchored, and means cooperating with the opposite end of said rod for clamping engagement with said hopper and bowl-like popping chamber.

6. In a corn popping machine, a base portion, a chamber supported thereby, a heating element within said chamber, a popping chamber covering said first chamber, a driving shaft extending vertically through said base and said first chamber, and into said popping chamber, and one or more stirring arms carried by said shaft for agitating the grains of corn on said heating element, the terminals of said arms being arranged for moving the grains of corn to the center of said heating element.

7. In a corn popper, a hollow base portion, a chamber supported thereby, a heating element mounted therein, a hood covering said heating element, said chamber, heating element and hood having aligning openings at their axes, and one or more rotating stirring arms the free ends of which move over the face of the hood and are curved for causing the grains of corn to move towards the center of the hood and discharge through said aligning openings.

8. In a corn popper, a heating element having an axial opening therethrough, a driving shaft, and one or more stirring arms carried by and rotatable with said shaft, said arms extending outwardly from the shaft and thence downwardly to the heating element and thence inwardly over the face of the heating element, the inwardly extending ends of the arms being curved and arranged to move the corn towards the opening in the heating element.

9. In a corn popper, a heating element having a central opening therethrough, a shaft extending centrally through said opening, bearings for said shaft, one or more stirring arms carried by and rotatable with said shaft, the free ends of said arms being arranged to move the corn towards the opening in said heating element, and means surrounding said opening for regulating the discharge of the corn through said opening.

10. In a corn popper, a heating element, a chamber in which said heating element is located, heat resisting insulating material below said heating element, and a hood of heat resisting and insulating material covering said heating element, said hood having a plurality of openings therethrough for the escape of heat from the interior of said hood.

11. In a corn popper, a heating element having an axial opening therethrough for the discharge of the corn, means for agitating and moving the corn toward said opening, a separating plate below said opening having fingers thereon for separating the popped from the unpopped grains, a depression in said plate and means in said depression for absorbing and retaining a lubricant.

12. In a corn popper, a heating element having a central opening, arms for agitating and moving grains of corn toward the center of said heating element, a shaft supporting and rotating said arms, bearings for said shaft, a separating disc below said opening in the heating element for separating the popped from the unpopped grains as they descend through said opening, and means carried by said disc for carrying a lubricant and supplying the lubricant to said bearings.

13. In a corn popper, a heating element having a discharge opening at its axial center, means for agitating the grains of corn above said heating element and moving the same inwardly to discharge through said axial opening, a separating disc below said opening, a shaft extending through said discharge opening and through said disc, and means rotated by said shaft for forcing the popped grains of corn from off said disc.

14. In a corn popper, a heating element, means for enclosing the heating element and confining the heat directly on the corn being popped, means for causing the corn to discharge at the axial center of the heating element, a cabinet supporting said heating element and having compartments therein, means for separating the popped from the unpopped grains after they discharge from the heating element, means for forcing the popped grains from the separating means, and means for conveying the unpopped grains into one of the compartments of the cabinet.

15. In a corn popper, a cabinet, a housing mounted on said cabinet, a base supported by said cabinet within said housing, a chamber mounted on said base, a heating element in said chamber, insulating material enclosing said heating element, said insulating material, heating element and chamber having registering openings at their axial centers, a transparent bowl like member mounted on said chamber and forming a substantially air tight popping chamber, means in the popping chamber for agitating the corn therein and moving the same towards said openings for discharging from the popping chamber, means below said openings for separating the popped from the unpopped grains, and means for conveying the separated grains to different compartments.

16. In a corn popper, a heating element, a hood enclosing said heating element, said hood and heating element having aligning axial openings, means for moving the grains of corn to discharge through said openings, a collar surrounding said openings adapted to prevent the discharge of the unpopped grains through said openings, a bearing, a bar connecting the bearing with said collar, said bar having an inclined lower face, a pull rod, and an upwardly extending arm at the inner end of said pull rod for elevating said collar when the pull rod is moved outwardly.

In testimony whereof I hereto affix my signature.

LUTHER J. ISENHOUR.